United States Patent Office 2,719,147
Patented Sept. 27, 1955

2,719,147

THERMAL MODIFICATION OF DEXTRAN

Ivan A. Wolff, Paul R. Watson, and Carl E. Rist, Peoria, Ill., assignors to the United States of America as represented by the Secretary of Agriculture No Drawing. Application April 24, 1951,
Serial No. 222,728

3 Claims. (Cl. 260—209)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the modification of microbiologically- or enzyme-produced polysaccharides, such as dextran, levan, mannan, galactan, and the like, and relates more particularly to the thermal modification of dextran.

Polysaccharides, particularly those of the type produced by microorganisms such as *Leuconostoc mesenteroides*, and the like, or by polysaccharide-producing enzymes derived from such organisms, have been suggested for various pharmaceutical uses. For example, the natural polysaccharides, acid hydrolyzed or depolymerized to varying degrees of completion, have been proposed as a component to be used in an infusion or injection fluid to perform some of the functions of blood and blood plasma in the circulatory system. Prior methods suggested for depolymerization have required close control of the hydrolysis, and the products obtained appear to be complex in nature, consisting of a mixture of substances of widely varying molecular weight.

These prior results are in keeping with the known behavior of polysaccharides in general towards acid hydrolysis. The effect of the acid under hydrolytic conditions is more or less random, and the products, although often comprising molecules possessing a structure similar to the starting material, albeit of lower molecular weight, nevertheless, are not themselves of uniform molecular weight or size, and are moreover admixed with ultimate hydrolysis products such as glucose, as well as the low molecular weight di- and oligosaccharides.

We have discovered a method whereby these polysaccharides may be depolymerized or thermally split in such a manner that the average molecular size may be varied at will over a broad range. Moreover, we are able to prepare a product of predetermined viscosity containing little or no mono-, di-, or oligosaccharides. Polysaccharides in the desired molecular weight ranges may then be obtained by fractionation in larger yields than is possible in the case of prior acid-hydrolyzed materials.

In general according to the invention a polysaccharide, such as dextran, levan, galactan, or mannan, is heated in the absence of substantial amounts of moisture or catalyst to a temperature within the range of 180°–210° C. for a period which may vary from 1 hr. up to 8 hrs. or longer. This treatment results in cleavage of the polysaccharide molecule in a surprisingly orderly manner. The degree of cleavage occurs smoothly within the temperature ranges, the degree of cleavage varying proportionately with the time of heating for any given temperature. When the temperature is varied within the range, a 10° C. difference in temperature is equivalent to about 3 or 4 hrs. heating time.

The treatment effects no major structural change beyond cleavage of the polysaccharide molecules. The resulting products have very little reducing power, and their optical rotations are lower than that of the original dextran. Furthermore, reasonably exhaustive analyses indicate that the treatment results in production of negligible amounts, if any, of glucose or low molecular weight oligosaccharides.

The heating is carried out on the polysaccharide in an air-dry or oven-dried state. By the method unfractionated modified products having intrinsic viscosities between 0.15 and 1.20 are produced. It is necessary to control the temperature within fairly narrow limits in order to achieve predetermined results.

The resulting modified polysaccharide products are of good color and possess a relatively high pH in aqueous solution, compared with such products as pyrodextrins prepared from starch. The products in general dissolve easily and rather rapidly in water at room temperature to give clear solutions which may be slightly colored.

The products show very little tendency to darken by the treatment until the higher temperatures are reached. Thus, at temperatures of 180° C. and at the longer time period of about 8 hours, the products begin to assume a very slight tan tint. Dextran, for example, heated at 200° C. for 8 hours is a very light tan. At temperatures at or above 210° C., however, a more drastic decomposition occurs after 4 hours, the products are brown, and contain a considerable amount of water-insoluble material. In connection with color changes in the products, samples of the same viscosity seem to have identical color, even though produced at different temperatures at different periods of heating. This characteristic serves as a rough indication of the viscosity of the products.

The following specific examples illustrates the invention.

EXAMPLES 1–7

Experiments were carried out in sets of eight 0.50-gram samples of dextran. Each sample was packed in the bottom of a test tube with a glass tamp. The packed tubes were then placed in a metal rack, and each was fitted with a glass tube connected to a vacuum line. The glass tube extended to within about 1.5 inches of the packed sample, the glass tubes being held in place by grooved stoppers. By turning on the vacuum, a gentle current of air passed through the test tubes. The rack and test tubes were then lowered into an oil bath maintained at the predetermined temperature (see Table I). A test tube was removed each hour, and the modified product allowed to come to equilibrium with the atmosphere. The procedure was repeated for each 10° C. increment of temperature.

Inherent viscosities $$\frac{(ln\eta_{rel})}{c}$$

at 0.2 percent concentrations were taken, as shown in Table I.

Table I
INHERENT VISCOSITY VALUES [1]

| Ex. No. | ° C. | 1 hr. | 2 hrs. | 3 hrs. | 4 hrs. | 5 hrs. | 6 hrs. | 7 hrs. | 8 hrs. |
|---|---|---|---|---|---|---|---|---|---|
| 1 | 150 | | | | | | | | 1.20 |
| 2 | 160 | | | | | | | | 1.27 |
| 3 | 170 | | | | | | | | 1.30 |
| 4 | 180 | 1.19 | 1.27 | 1.29 | 1.20 | 1.07 | 0.99 | 0.92 | 0.89 |
| 5 | 190 | 1.25 | 1.08 | 0.99 | 0.80 | 0.58 | 0.53 | 0.45 | 0.39 |
| 6 | 200 | 1.13 | 0.78 | 0.45 | 0.32 | 0.28 | 0.22 | 0.21 | 0.19 |
| 7 | 210 | 0.54 | 0.25 | 0.15 | 0.15 | 0.14 | 0.05 | 0.05 | 0.06 |

[1] The concentration was approx. 0.2% in every case except the 210° C. series where the concentration gets lower due to insolubility. The original undegraded dextran had an inherent viscosity of 1.19.

It will be noted that there is a slight increase in viscosity before the viscosity begins to decrease. This trend is noticeable only in Examples 4 and 5 since, in Examples 6 and 7, the trend had passed by the time the first sample was taken.

The decrease in viscosity is accompanied by a decrease in optical rotation. The samples of Example 6 were prepared in 0.2 percent aqueous solution, and the specific optical rotation values were observed, as shown in Table II.

Table II

SPECIFIC OPTICAL ROTATION (+°) AT 25° C.

| Time of heating (hours) | | | | | | | |
|---|---|---|---|---|---|---|---|
| 1 | 2 | 3 | 4 | 5 | 6 | 7 | 8 |
| 211 | 197 | 193 | 193 | 190 | 187 | 181 | 174 |

The original dextran as well as the thermally modified products were analyzed by oxidation with sodium metaperiodate [Jeanes and Wilham, J. Am. Chem. Soc. 72, 2655 (1950)]. In this procedure only those anhydroglucose units linked through the 1 and 6 positions on oxidation give one mole of formic acid, while other glucosidic linkage types do not oxidize in this fashion. It is thus possible to get valuable structural information by oxidizing a known amount of polysaccharide with periodate and measuring accurately by titration the resulting formic acid. Table III shows the average formic acid production and ratio of 1,6 to non-1,6 linkages for several typical samples.

Table III

| Sample | Moles HCOOH per mole anhydroglucose unit [1] | Ratio 1:6/ non 1:6 linkages |
|---|---|---|
| Original | .946 | 18 |
| 200° C.—5 hrs | .904 | 10 |
| 200° C.—5 hrs | .899 | 9 |
| 200° C.—8 hrs | .893 | 8 |

[1] Average of values obtained at the end of 48 and 72-hr. oxidation periods.

It can be concluded from the above data that the thermally degraded products may be somewhat more branched than the original dextran, but that no major structural changes have occurred.

The samples were all substantially free of glucose or low molecular weight oligosaccharides, indicating that the thermal cleavage is much less random than the degradation occurring in acid hydrolysis. The 7-hr. sample of Example 6 is illustrative. A 2-percent solution was dialyzed through a cellulose sausage casing. After 48 hours, approximately 10 percent of the material in solution had passed through the membrane. The solution containing the material which had passed through the membrane was concentrated and was analyzed by paper chromatography. A solvent consisting of 3 parts butanol, 2 parts pyridine and 1.5 parts water was used for developing the chromatogram. Two different indicating reagents were applied by spraying; one a modified Tollens reagent, and the other an alkaline permanganate spray. The dialyzed and concentrated material did not move in a single climb from a spot made of 40 applications of approximately 1 percent solution.

In contrast with the above procedure, a sample of dextran was hydrolyzed with aqueous hydrochloric acid at pH 2 for 4.5 hours at 99°–100° C. From the neutralized solution the low molecular weight materials were separated as that fraction soluble in 85 percent ethyl alcohol. This fraction definitely contained appreciable quantities of glucose and other oligosaccharides. This was established by paper chromatographic analysis by applying 10 drops of 5 percent solution at the same point on the starting line, using the same developing solution mentioned above, and benzidine-citric acid as the indicating reagent.

The thermally modified polysaccharides of the present invention may be fractionated by known methods, as by solvent precipitation, into products of a relatively homogeneous character. For example, the thermally modified dextran may be dissolved in water and partially insolubilized by the graded addition of an organic non-solvent, such as methanol or ethanol. In this manner, one may separate the modified product into fractions by separating the precipitated material between the addition of increments of the precipitating solvent.

Fractionation may be effected, for example, by adding ethanol or methanol to a 2 to 7 percent aqueous solution of the modified polysaccharide. As the concentration of alcohol in the medium approaches a critical value, usually between 35 and 40 percent, precipitation begins. Precipitated material may be removed after equilibrium is reached and the procedure repeated on the clear unprecipitated solution.

The following exemplary data illustrate the fractionation of 4 of the samples from Examples 1 to 7. The precipitation procedure was as follows.

A 0.2-gram portion of the sample was dissolved in sufficient water, in a centrifuge tube, to make up a 5 or 6 percent solution. The tubes were held in a constant temperature bath at 25° C. and the precipitating solvent added from a microburet until the predetermined concentration was reached as shown in the following table. The tubes were held in the bath for 1 hr. with occasional stirring, and then centrifuged to effect the separation of phases. The clear upper layers were removed, and the procedure repeated for each fraction. A large excess of the precipitating solvent was added to the precipitated fraction, and it was stirred and washed in the solvent. It was then desiccator dried and the weight determined. The results are summarized in the following table.

Table IV

| Sample Identification | Percent by volume of precipitating solvent | Weight Recovery | Percent Recovery |
|---|---|---|---|
| 190° C., 7 hr. sample, 5% water solution.[1] | 38.9 EtOH | .092 | 46 |
| | 41.2 EtOH | .030 | 15 |
| | 43.3 EtOH | .020 | 10 |
| | 45.2 EtOH | .014 | 7 |
| | 63.0 EtOH | .057 | 28.5 |
| | | .213 | 106.5 |
| 190° C., 7 hr. sample, 5% water solution. | 38.9 EtOH | .071 | 35.5 |
| | 41.2 EtOH | .050 | 25.0 |
| | 43.3 EtOH | .024 | 12.0 |
| | 83.3 EtOH | .058 | 29.0 |
| | | .203 | 101.5 |
| 200° C., 6 hr. sample, 6% water solution. | 45 MeOH | .025 | 12.5 |
| | 50 MeOH | .074 | 37.0 |
| | 67 MeOH | .085 | 42.5 |
| | | .184 | 92.0 |
| .074 g. fraction from above fractionation, 6% water solution. | 45 MeOH | .000 | 00 |
| | 50 MeOH | .040 | 54.0 |
| | excess MeOH | discarded | unknown |
| 200° C., 6 hr. sample, 6% water solution. | 45 MeOH | .021 | 10.5 |
| | 50 MeOH | .090 | 45.0 |
| | 67 MeOH | .072 | 36.0 |
| | | .183 | 91.5 |
| Control dextran [1] (undegraded), 5% water solution. | 39.4 EtOH | .163 | 81.1 |
| | 41.6 EtOH | .032 | 15.9 |
| | 43.7 EtOH | .005 | 2.5 |
| | 64.0 EtOH | .001 | 0.5 |
| | | .201 | 100.0 |

[1] Fractionation not carried out in constant temperature bath.

We claim:

1. Method comprising subjecting dextran in the substantial absence of moisture to a temperature within the range of 180°–210° C. for a period of time from 1 to 8 hrs., whereby to effect molecular cleavage of the dextran molecules.

2. Method comprising subjecting dextran in the substantial absence of water to temperatures within the range of 180° to 210° C. for a period of time of at least about 1 hour.

3. Method comprising subjecting dextran in the substantial absence of water to a temperature within the range of 180° to 210° C. for a period of time of at least about 1 hour and recovering from said treated dextran fractions of a relatively homogeneous character.

References Cited in the file of this patent

UNITED STATES PATENTS

| | | |
|---|---|---|
| 2,565,507 | Lockwood et al. | Aug. 28, 1951 |

FOREIGN PATENTS

| | | |
|---|---|---|
| 583,378 | Great Britain | Dec. 17, 1946 |

OTHER REFERENCES

Hibbert et al.: Canadian Jour. of Research, p. 228 (1931).

Bell et al.: Lancet, pp. 135–137, January 22, 1949.

Renfrew et al.: Jour. Amer. Phar. Assoc., pp. 177–179, v. 38, 1949.